(12) United States Patent
Illikainen (10) Patent No.: US 10,080,196 B2
(45) Date of Patent: Sep. 18, 2018

(54) METHOD AND APPARATUS FOR PROLONGING LASTING TIME OF INACTIVE MODE

(71) Applicant: Spreadtrum Hong Kong Limited, Kowloon, Hong Kong (CN)

(72) Inventor: Teemu Illikainen, Shanghai (CN)

(73) Assignee: SPREADTRUM HONG KONG LIMITED, Kowloon, Hong Kong (CN)

( * ) Notice: Subject to any disclaimer, the term of this patent is extended or adjusted under 35 U.S.C. 154(b) by 114 days.

(21) Appl. No.: 14/925,167

(22) Filed: Oct. 28, 2015

(65) Prior Publication Data

US 2017/0127356 A1    May 4, 2017

(51) Int. Cl.
  *G08C 17/00*  (2006.01)
  *H04W 52/02*  (2009.01)
  *H04W 8/18*   (2009.01)

(52) U.S. Cl.
  CPC .......... *H04W 52/0258* (2013.01); *H04W 8/18* (2013.01)

(58) Field of Classification Search
  CPC ........................ H04W 52/0258; H04W 8/18
  USPC ............................................................ 370/311
  See application file for complete search history.

(56) References Cited

U.S. PATENT DOCUMENTS

| | | | | |
|---|---|---|---|---|
| 9,167,592 B1* | 10/2015 | Hsu | ........ | H04W 76/00 |
| 2004/0258068 A1* | 12/2004 | Lim | ........ | H04L 47/564 |
| | | | | 370/394 |
| 2013/0215850 A1* | 8/2013 | Zakrzewski | ...... | H04W 52/0261 |
| | | | | 370/329 |

\* cited by examiner

*Primary Examiner* — Peter Cheng
(74) *Attorney, Agent, or Firm* — Cantor Colburn LLP (57) ABSTRACT

The embodiments of the present disclosure provide a method for prolonging a lasting time of an inactive mode, which includes: classifying data to be sent as delay tolerant data and delay intolerant data; formatting the delay tolerant data into at least one delay tolerant data packet; and determining a maximum wait time for each of the at least one delay tolerant data packet, wherein the maximum wait time is adapted to determine for how long the device may remain in the inactive mode before the delay tolerant data packet shall be sent at latest. In addition, an apparatus for prolonging a lasting time of an inactive mode is also provided. Accordingly, the embodiments of the present disclosure possess the advantages that reduction in signaling and power consumption.

10 Claims, 7 Drawing Sheets

METHOD AND APPARATUS FOR PROLONGING LASTING TIME OF INACTIVE MODE

TECHNICAL FIELD

The present disclosure generally relates to telecommunications, and more particularly, to a method and an apparatus for prolonging a lasting time of an inactive mode.

BACKGROUND

In the era of big-data, data communications between devices become more and more frequent. Conventionally, if data are to be sent in a device, they are required to be passed to a network layer from an application layer in that device. Once the data reach the network layer, at least a communication feature of the device is activated. Thus, the device is switched to an active mode, and the data are sent to other devices via networks immediately. After sending all the data from the application layer, at least the communication feature of the device is shut down, and the device is switched to an inactive mode. In the inactive mode, no data will be sent to other devices. Such a scheme requires frequent switches between the active mode and the inactive mode, so that a large amount of signaling and power consumption will be caused.

However, some communication devices may need to work continuously for a very long time period without recharging power. For example, measuring devices, sensors, fire alarm devices, indoor or outdoor security monitors, etc., are required to work for several months or even years. Moreover, these communication devices are designed to collect data frequently, but it's not necessary for them to frequently send out the collected data. Therefore, for these communication devices, power saving is required, and frequent activation of the communication feature would better be avoided.

SUMMARY

With respect to the problem addressed in the background, embodiments of the present disclosure provide a method for prolonging a lasting time of an inactive mode, which may include: a device, which is currently in an inactive mode, classifying data to be sent as delay tolerant data and delay intolerant data; formatting the delay tolerant data into at least one delay tolerant data packet; and determining a maximum wait time for each of the at least one delay tolerant data packet, wherein the maximum wait time is adapted to determine for how long the device may remain in the inactive mode before the delay tolerant data packet shall be sent at latest.

Data required to be sent immediately, for example, emergency data, configuration modification data, etc., may be classified as delay intolerant data, while data which are not necessarily sent right away may be classified as delay tolerant data. The maximum wait time for each delay tolerant data packet indicates for how long this data packet can be hold back for sending. In some embodiments, the maximum wait time may be determined automatically according to type of the delay tolerant data. In some embodiments, the maximum wait time may be configurable, i.e., it can be set according to user instruction.

In some embodiments, the method may further include: pushing the at least one delay tolerant data packet into a queue so that the queue may include one or more delay tolerant data packets, wherein, prior to pushing the at least one delay tolerant data packet into the queue, the queue may or may not be empty, wherein each of the one or more delay tolerant data packets has a maximum wait time, and one of the maximum wait times of the one or more delay tolerant data packets in the queue is assigned to a timer, where the one of the maximum wait times determines for how long the device may remain in the inactive mode before the delay tolerant data packet shall be sent at latest.

Specifically, assigning one of the maximum wait times of the one or more delay tolerant data packets in the queue to the timer may include: if the maximum wait time of the at least one delay tolerant data packet being pushed into the queue is less than the timer, updating the timer.

In some embodiments, the method may further include: switching the inactive mode to an active mode when the timer expires; and sending at least one of the one or more delay tolerant data packets in the queue to other devices.

Embodiments of the present disclosure also provide an apparatus for prolonging a lasting time of an inactive mode, which may include: a data classifying unit adapted for classifying data to be sent as delay tolerant data and delay intolerant data; a packet formatting unit adapted for formatting the delay tolerant data into at least one delay tolerant data packet; and a maximum wait time determining unit adapted for determining a maximum wait time for each of the at least one delay tolerant data packet, wherein the maximum wait time is adapted to determine for how long the device may remain in the inactive mode before the delay tolerant data packet shall be sent at latest.

In some embodiments, the apparatus may also include: a packet queuing unit adapted for pushing the at least one delay tolerant data packet into a queue, so that the queue may include one or more delay tolerant data packets, wherein, prior to pushing the at least one delay tolerant data packet into the queue, the queue may or may not be empty, wherein each of the one or more delay tolerant data packets in the queue has the maximum wait time; and one of the maximum wait times may be assigned to a timer.

In some embodiments, the apparatus may further include: a transmission unit adapted for switching the inactive mode to the active mode and sending at least one of the one or more delay tolerant data packets in the queue to other devices.

BRIEF DESCRIPTION OF THE DRAWINGS

For better clarifying the embodiments of the present disclosure, a brief description of drawings needed for describing the embodiments is provided. Obviously, the drawings which follow are the embodiments of the present disclosure. By taking effort with creativity, those skilled in the art can acquire other drawings based on the drawings provided.

DETAILED DESCRIPTION

Regarding to the problem addressed in the background, the inventor discovers that data to be sent may be classified as delay intolerant data, which have to be sent immediately such as emergency data, configuration modification data, acknowledgement data, notification data, etc. and delay tolerant data, which can be delayed for either a short period of time or a long period of time, such as real-time data, measuring data, sensor data, statistical data, historical data, etc. In real applications, the delay tolerant data have a much larger amount than the delay intolerant data. Thus, in an inactive mode, collecting as many as possible the delay tolerant data may determine for how long the device may remain in the inactive mode before the delay tolerant data packet shall be sent at latest so as to greatly reduce an amount of signaling and power consumption.

In order to clarify the objects, characteristics and advantages of the present disclosure, embodiments of the present disclosure will be described in detail in conjunction with the accompanying drawings. However, in certain instances, well known or conventional details are not described in order to avoid obscuring the description of the inventive concepts set forth in the embodiments described herein. References to "one embodiment," "an embodiment," "another embodiment," "yet another embodiment," or their respective variations in the present disclosure are not necessarily references to the same embodiment; and, such references mean at least one.

Figure 1:
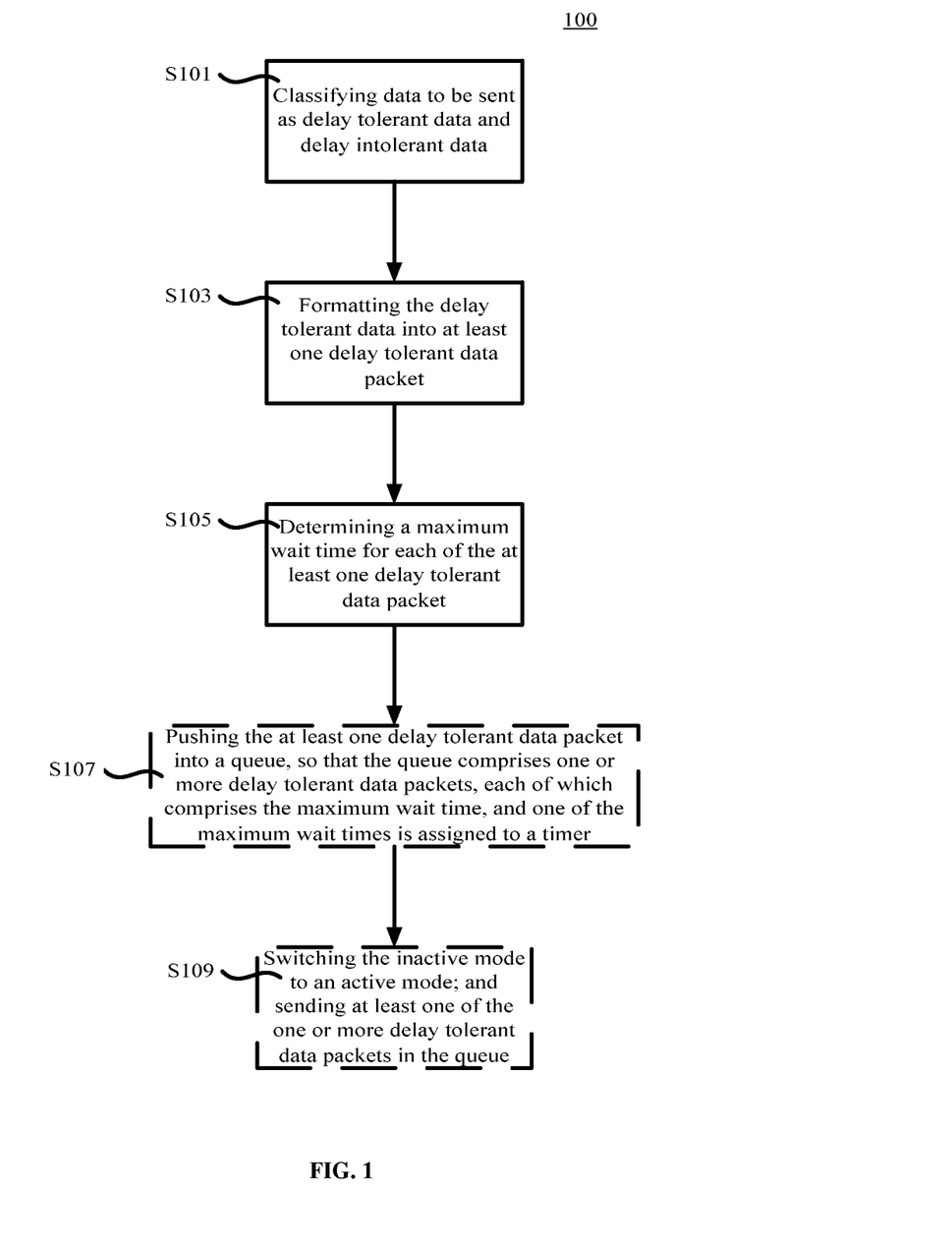
FIG. 1 schematically illustrates a block diagram presenting a method for prolonging a lasting time of an inactive mode according to one embodiment in the present disclosure.

FIG. 1 schematically illustrates a block diagram presenting a method 100 for prolonging a lasting time of an inactive mode according to one embodiment in the present disclosure.

Referring to FIG. 1, the method 100 includes:

S101: classifying data to be sent as delay tolerant data and delay intolerant data;

S103: formatting the delay tolerant data into at least one delay tolerant data packet; and S105: determining a maximum wait time for each of the at least one delay tolerant data packet, wherein the maximum wait time is adapted to determine for how long the device may remain in the inactive mode before the delay tolerant data packet shall be sent at latest.

Specifically, in the inactive mode, at least a transmission feature and a reception feature of a device are shut down so that there is no communication with other devices, and at least one processor (e.g. CPU, microprocessor, etc.) is working for processing tasks such as passing data from one layer to other layers, switching the inactive mode to an active mode, etc.

Specifically, in S101, classifying data to be sent as delay tolerant data and delay intolerant data is implementation dependent. For example, a measuring device may be designed to take measurement of temperature once per minute, and send these measuring data of temperature once per hour, if no emergency occurs. Equivalently, the measuring device collects 60 sets of measuring data before each communication with other devices. Therefore, in this case, the measuring data of temperature may be classified as the delay tolerant data. However, once the temperature reaches 100 degree Celsius, the measuring device may be adapted to send 10 sets of recent measuring data immediately. Thus, in this case, the 10 sets of measuring data may be classified as the delay intolerant data.

Specifically, in S103, formatting the delay tolerant data into at least one delay tolerant data packet may be done using a plenty of methods. Therefore, any one of the plenty of methods may be used to formatting the delay tolerant data into at least one delay tolerant data packet and the delay intolerant data into at least one delay intolerant data packet, and no limitation is imposed on the method used for formatting in the present disclosure. Furthermore, the delay intolerant data are formatted into at least one delay intolerant data packet, which also may be done using the plenty of methods.

Specifically, in S105, determining a maximum wait time for each of the at least one delay tolerant data packet is implementation dependent. For example, for statistical data or historical data, a relatively long maximum wait time may be determined, as these data are normally not urgent to be transmitted. For another example, real-time data (e.g., data requested by a webpage) may be assigned with a relatively short maximum wait time to ensure their instantaneity.

In some embodiments, referring to FIG. 1, the method 100 may further include: in S107, pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer.

In some embodiments, referring to FIG. 1, the method 100 may further include: in S107, pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer. Wherein, if the timer is not started, assigning one of the maximum wait times to the timer may include: assigning a smallest one of the maximum wait times of the one or more delay tolerant data packets in the queue to the timer.

In some embodiments, referring to FIG. 1, the method 100 may further include: in S107, pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer.

Wherein, if the timer is running, which means the queue is not empty before pushing the at least one delay tolerant data packet into the queue, assigning one of the maximum wait times to the timer may include: updating the timer, if the at least one delay tolerant data packet with the maximum wait time less than the remaining value of the timer is pushed into the queue.

In some embodiments, referring to FIG. 1, the method 100 may further include: in S107, pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer. Wherein, if the timer is running, which means the queue is not empty before pushing the at least one delay tolerant data packet into the queue, assigning one of the maximum wait times to the timer may include: updating the timer, if the at least one delay tolerant data packet with the maximum wait time less than the remaining value of the timer is pushed into the queue. Wherein, updating the timer, if the at least one delay tolerant data packet with the maximum wait time less than the remaining value of the timer is pushed into the queue may include: comparing the maximum wait time of the at least one delay tolerant data packet with the remaining value of the timer; and, if a smallest maximum wait time of the at least one delay tolerant data packet is less than the remaining value of the timer, a smallest maximum wait time of the one or more delay tolerant data packets in the queue is assigned to the timer.

Specifically, in S107, each of the one or more delay tolerant data packets in the queue may be stored in a non-transitory storage medium, such as a Read-Only Memory (ROM), a Random Access Memory (RAM), a flash memory, an Erasable Programmable ROM (EPROM), an Electrically Erasable Programmable ROM (EEPROM), a magnetic card, an optical card, any type of disk including a floppy disk, an optical disk, a Compact Disc-ROM (CD-ROM) and a magnetic-optical disk, etc.

In some embodiments, referring to FIG. 1, the method 100 may further include: in S109, switching the inactive mode to an active mode; and sending at least one of the one or more delay tolerant data packets in the queue.

In some embodiments, referring to FIG. 1, the method 100 may further include: in S109, switching the inactive mode to an active mode; and sending at least one of the one or more delay tolerant data packets in the queue. Wherein, due to sending the delay intolerant data packet, the inactive mode may be switched to the active mode, and a part of the one or more delay tolerant data packets in the queue may be sent. Wherein, the delay intolerant data packet may be sent before sending the part of the one or more delay tolerant data packets in the queue; or the delay intolerant data packet may be pushed into the queue and sent with the part of the one or more delay tolerant data packets in the queue.

In some embodiments, referring to FIG. 1, the method 100 may further include: in S109, switching the inactive mode to an active mode; and sending at least one of the one or more delay tolerant data packets in the queue. Wherein, due to sending the delay intolerant data packet, the inactive mode may be switched to the active mode and the one or more delay tolerant data packets in the queue may be sent till the queue is empty. Wherein, the delay intolerant data packet may be sent before sending the one or more delay tolerant data packets in the queue; or the delay intolerant data packet may be pushed into the queue and sent with the one or more delay tolerant data packets in the queue.

In some embodiments, referring to FIG. 1, the method 100 may further include: in S109, switching the inactive mode to an active mode; and sending at least one of the one or more delay tolerant data packets in the queue. Wherein, due to a user action such as touching a screen, pushing a button, etc., or any other reason, the inactive mode may be switched to the active mode, and a part of the one or more delay tolerant data packets in the queue may be sent.

In some embodiments, referring to FIG. 1, the method 100 may further include: in S109, switching the inactive mode to an active mode; and sending at least one of the one or more delay tolerant data packets in the queue. Wherein, due to a user action such as touching a screen, pushing a button, etc., or any other reason, the inactive mode may be switched to the active mode, and the one or more delay tolerant data packets in the queue may be sent till the queue is empty.

In some embodiments, referring to FIG. 1, the method 100 may further include: in S109, switching the inactive mode to an active mode; and sending at least one of the one or more delay tolerant data packets in the queue. Wherein, due to expiration of the timer, the inactive mode may be switched to the active mode, and a part of the one or more delay tolerant data packets in the queue may be sent. Wherein, the part of the one or more delay tolerant data packets includes a delay tolerant data packet with an expired maximum wait time.

In some embodiments, referring to FIG. 1, the method 100 may further include: in S109, switching the inactive mode to an active mode; and sending at least one of the one or more delay tolerant data packets in the queue. Wherein, due to expiration of the timer, the inactive mode may be switched to the active mode, and the one or more delay tolerant data packets in the queue may be sent till the queue is empty.

Specifically, the method 100 may be applied to both single application and multiple applications, thus at least one processor (e.g. CPU, microprocessor, etc.) may be required for performing the method 100 and at least one transmitter is required to send a packet to at least one device.

Specifically, the method 100 may be implemented in any layer between an application layer and a network layer of any protocol such as TCP/IP, OSI, etc.

Figure 2:
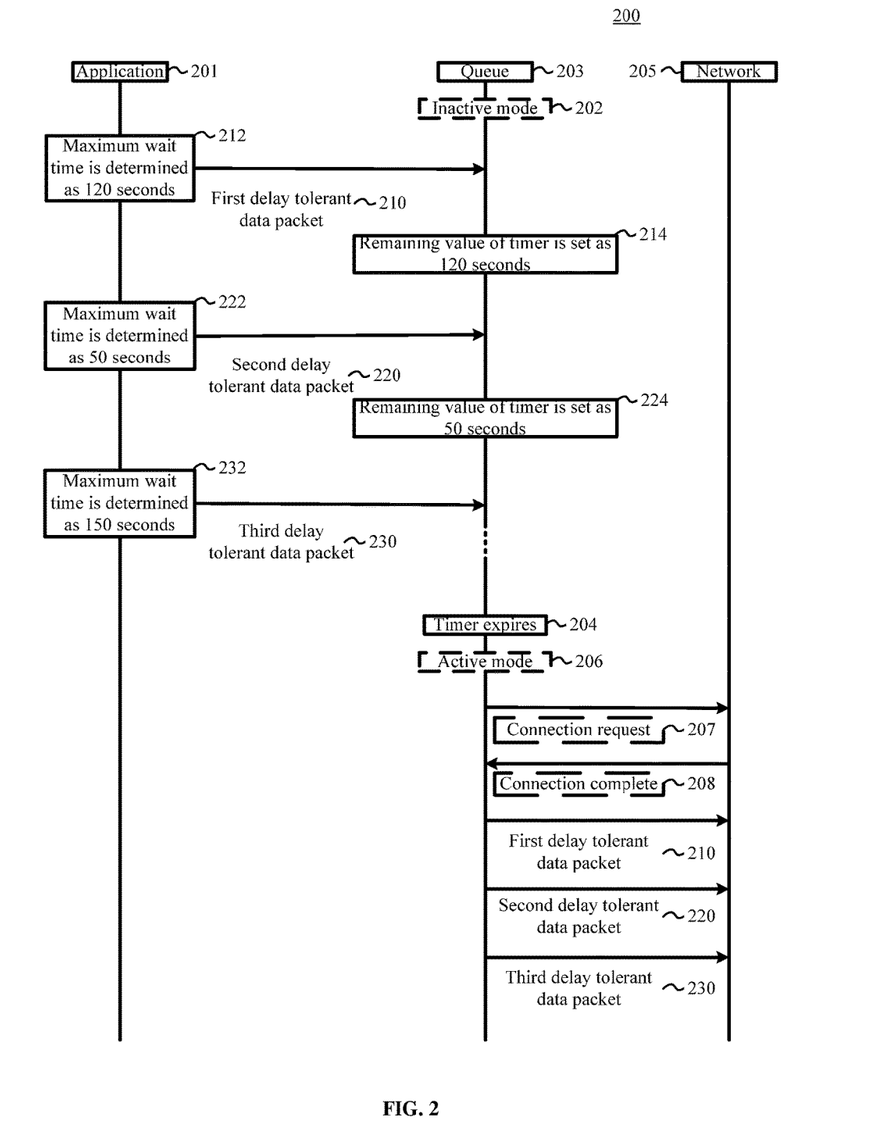
FIG. 2 schematically illustrates a flow diagram presenting an implementation of the method for prolonging a lasting time of an inactive mode according to one embodiment in the present disclosure.

FIG. 2 schematically illustrates a flow diagram presenting an implementation 200 of the method for prolonging a lasting time of an inactive mode according to one embodiment in the present disclosure. Referring to FIG. 2, in the implementation 200, a first delay tolerant data packet 210 is formatted using an application 201, and in a step 212, a maximum wait time of the first delay tolerant data packet 210 is determined as 120 seconds. In an inactive mode 202, the first delay tolerant data packet 210 is pushed into a queue 203. In a step 214, a remaining value of a timer is set as 120 seconds, which is the maximum wait time of the first delay tolerant data packet 210. After a period of time, for example, 30 seconds, a second delay tolerant data packet 220 is formatted using the application 201, and in a step 222, a maximum wait time of the second delay tolerant data packet 220 is determined as 50 seconds. In the inactive mode 202, the second delay tolerant data packet 220 is pushed into the queue 203. In a step 224, since the maximum wait time of the second delay tolerant data packet 220 is less than the remaining value of the timer currently, which is 90 seconds, the remaining value of the timer is set as 50 seconds, which is the maximum wait time of the second delay tolerant data packet 220. Another period of time, for example, 10 seconds later, a third delay tolerant data packet 230 is formatted using the application 201, and in a step 232, a maximum wait time of the third delay tolerant data packet 230 is determined as 150 seconds. In the inactive mode 202, the third delay tolerant data packet 230 is pushed into the queue 203. In this case, the timer is not updated because the maximum wait time of the third delay tolerant data packet 230 is greater than the remaining value of the timer at this moment, which is 40 seconds. After 40 seconds, the timer expires 204, and before expiration of the timer, no more packet is formatted. As soon as the timer expires 204, the inactive mode 202 is switched to an active mode 206, and the first delay tolerant data packet 210, the second delay tolerant data packet 220 and the third delay tolerant data packet 230 are one-by-one sent to a network 205.

In some embodiments, referring to FIG. 2, in the implementation 200, the first delay tolerant data packet 210 is formatted using the application 201, and in the step 212, the maximum wait time of the first delay tolerant data packet 210 is determined as 120 seconds. In the inactive mode 202, the first delay tolerant data packet 210 is pushed into the queue 203. In the step 214, the remaining value of the timer is set as 120 seconds, which is the maximum wait time of the first delay tolerant data packet 210. After a period of time, for example, 60 seconds, the second delay tolerant data packet 220 is formatted using the application 201, and in the step 222, the maximum wait time of the second delay tolerant data packet 220 is determined as 50 seconds. In the inactive mode 202, the second delay tolerant data packet 220 is pushed into the queue 203. In the step 224, since the maximum wait time of the second delay tolerant data packet 220 is less than the remaining value of the timer at this time point, which is 60 seconds, the remaining value of the timer is set as 50 seconds, which is the maximum wait time of the second delay tolerant data packet 220. Another period of time, for example, 40 seconds later, the third delay tolerant data packet 230 is formatted using the application 201, and in the step 232, the maximum wait time of the third delay tolerant data packet 230 is determined as 150 seconds. In the inactive mode 202, the third delay tolerant data packet 230 is pushed into the queue 203. In this case, the timer is not updated because the maximum wait time of the third delay tolerant data packet 230 is greater than the remaining value of the timer currently, which is 10 seconds. After 10 seconds, the timer expires 204, and before expiration of the timer, no more packet is formatted. As soon as the timer expires 204, the inactive mode 202 is switched to the active mode 206. Next, a connection request 207 may be sent to a network 205 from the queue 203, and after an acknowledgement (not shown) form the network 205 is received by the queue 203, a connection complete 208 may be sent to the queue 203 from the network 205 so that a network connection is established successfully. After the network connection is established successfully, the first delay tolerant data packet 210, the second delay tolerant data packet 220 and the third delay tolerant data packet 230 are one-by-one sent to the network 205.

Figure 3:
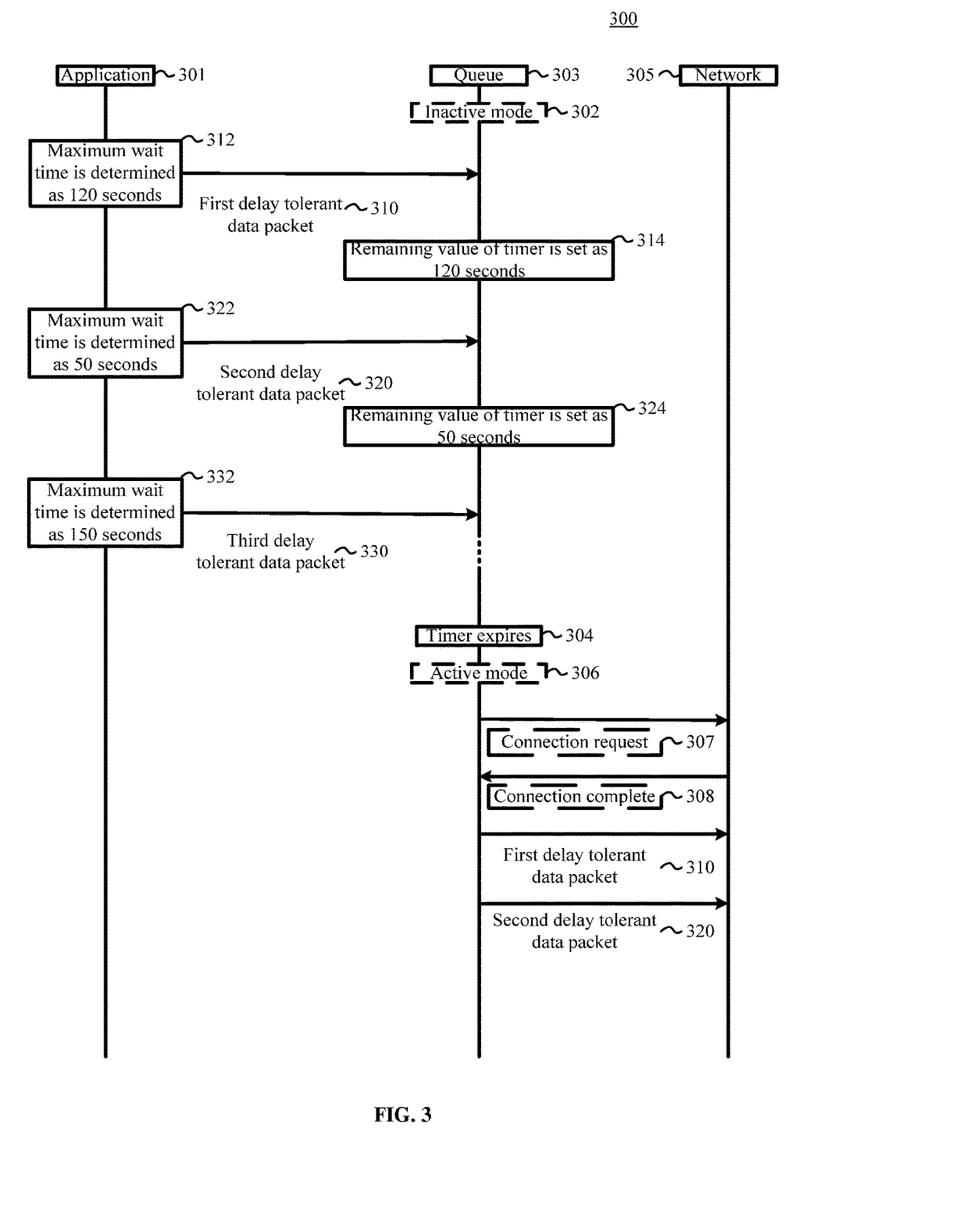
FIG. 3 schematically illustrates a flow diagram presenting an implementation of the method for prolonging a lasting time of an inactive mode according to another embodiment in the present disclosure.

FIG. 3 schematically illustrates a flow diagram presenting an implementation 300 of the method for prolonging a lasting time of an inactive mode according to another embodiment in the present disclosure. Referring to FIG. 3, in the implementation 300, a first delay tolerant data packet 310 is formatted using an application 301, and in a step 312, a maximum wait time of the first delay tolerant data packet 310 is determined as 120 seconds. In an inactive mode 302, the first delay tolerant data packet 310 is pushed into a queue 303. In a step 314, a remaining value of a timer is set as 120 seconds, which is the maximum wait time of the first delay tolerant data packet 310. After a period of time, for example, 10 seconds, a second delay tolerant data packet 320 is formatted using the application 301, and in a step 322, a maximum wait time of the second delay tolerant data packet 320 is determined as 50 seconds. In the inactive mode 302, the second delay tolerant data packet 320 is pushed into the queue 303. In a step 324, since the maximum wait time of the second delay tolerant data packet 320 is less than the remaining value of the timer at this moment, which is 110 seconds, the remaining value of the timer is set as 50 seconds, which is the maximum wait time of the second delay tolerant data packet 320. Another period of time, for example, 10 seconds later, a third delay tolerant data packet 330 is formatted using the application 301, and in a step 332, a maximum wait time of the third delay tolerant data packet 330 is determined as 150 seconds. In the inactive mode 302, the third delay tolerant data packet 330 is pushed into the queue 303. In this case, the timer is not updated because the maximum wait time of the third delay tolerant data packet 330 is greater than the remaining value of the timer at this time point, which is 40 seconds. After 40 seconds, the timer expires 304, and no more packet is formatted before expiration of the timer. As soon as the timer expires 304, the inactive mode 302 is switched to an active mode 306. Next, a connection request 307 may be sent to a network 305 from the queue 303, and after an acknowledgement (not shown) form the network 305 is received by the queue 303, a connection complete 308 may be sent to the queue 303 from the network 305 so that a network connection is established successfully. After the network connection is established successfully, the first delay tolerant data packet 310 and the second delay tolerant data packet 320 in the queue 303 are one-by-one sent to the network 305. The second delay tolerant data packet 320 has to be sent since the maximum wait time of the second delay tolerant data packet 320 expires.

Figure 4:
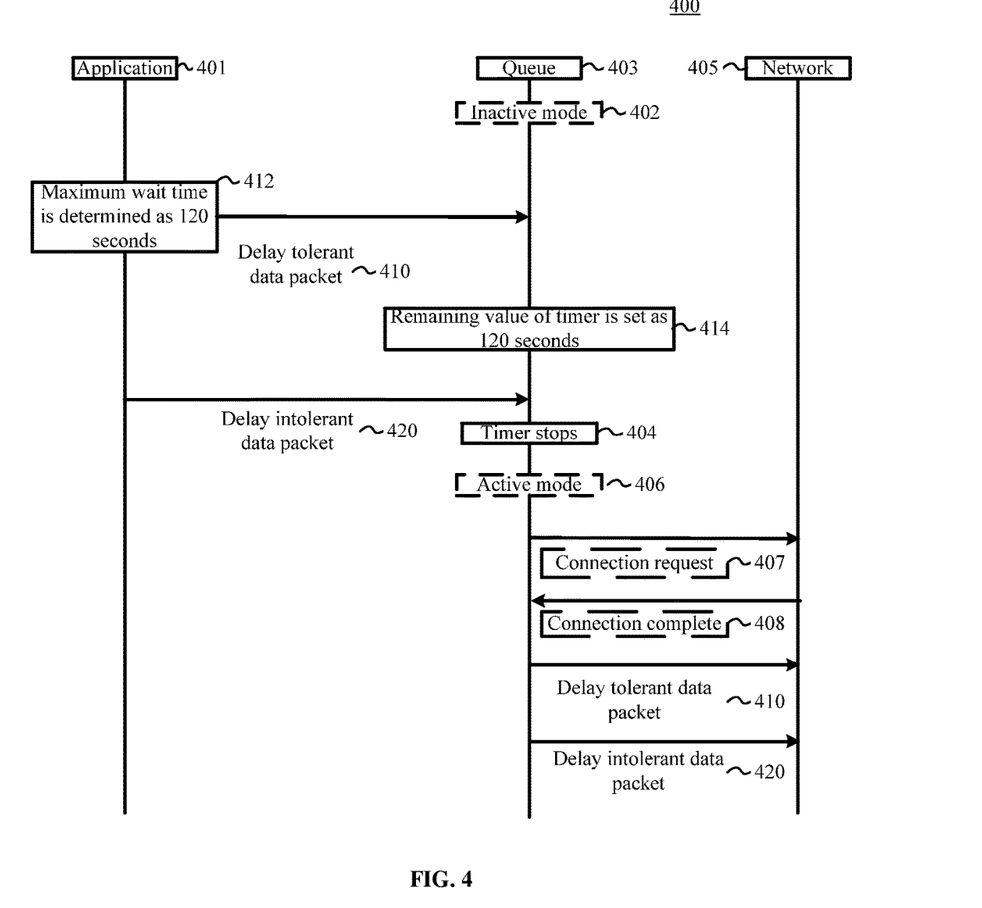
FIG. 4 schematically illustrates a flow diagram presenting an implementation of the method for prolonging a lasting time of an inactive mode according to another embodiment in the present disclosure.

FIG. 4 schematically illustrates a flow diagram presenting an implementation 400 of the method for prolonging a lasting time of an inactive mode according to one embodiment in the present disclosure. Referring to FIG. 4, in the implementation 400, a delay tolerant data packet 410 is formatted using an application 401, and in a step 412, a maximum wait time of the delay tolerant data packet 410 is determined as 120 seconds. In an inactive mode 402, the delay tolerant data packet 410 is pushed into a queue 403. In a step 414, a remaining value of a timer is set as 120 seconds, which is the maximum wait time of the delay tolerant data packet 410. After a period of time, a delay intolerant data packet 420 is pushed into the queue 403. In this case, the timer ceases 404 immediately, and the inactive mode 402 is switched to an active mode 406. Next, the delay tolerant data packet the 410 and the delay intolerant data packet 420 are one-by-one sent to a network 405.

In some embodiments, referring to FIG. 4, in the implementation 400, the delay tolerant data packet 410 is formatted using the application 401, and in the step 412, the maximum wait time of the delay tolerant data packet 410 is determined as 120 seconds. In the inactive mode 402, the delay tolerant data packet 410 is pushed into the queue 403. In the step 414, the remaining value of the timer is set as 120 seconds, which is the maximum wait time of the delay tolerant data packet 410. After a period of time, the delay intolerant data packet 420 is pushed into the queue 403. In this case, the timer ceases 404 immediately, and the inactive mode 402 is switched to the active mode 406. Next, a connection request 407 may be sent to the network 405 from the queue 403, and, after an acknowledgement (not shown) form the network 405 is received by the queue 403, a connection complete 408 may be sent to the queue 403 from the network 405 so that a network connection is established successfully. After the network connection is established successfully, the delay tolerant data packet the 410 and the delay intolerant data packet 420 are one-by-one sent to the network 405.

Figure 5:
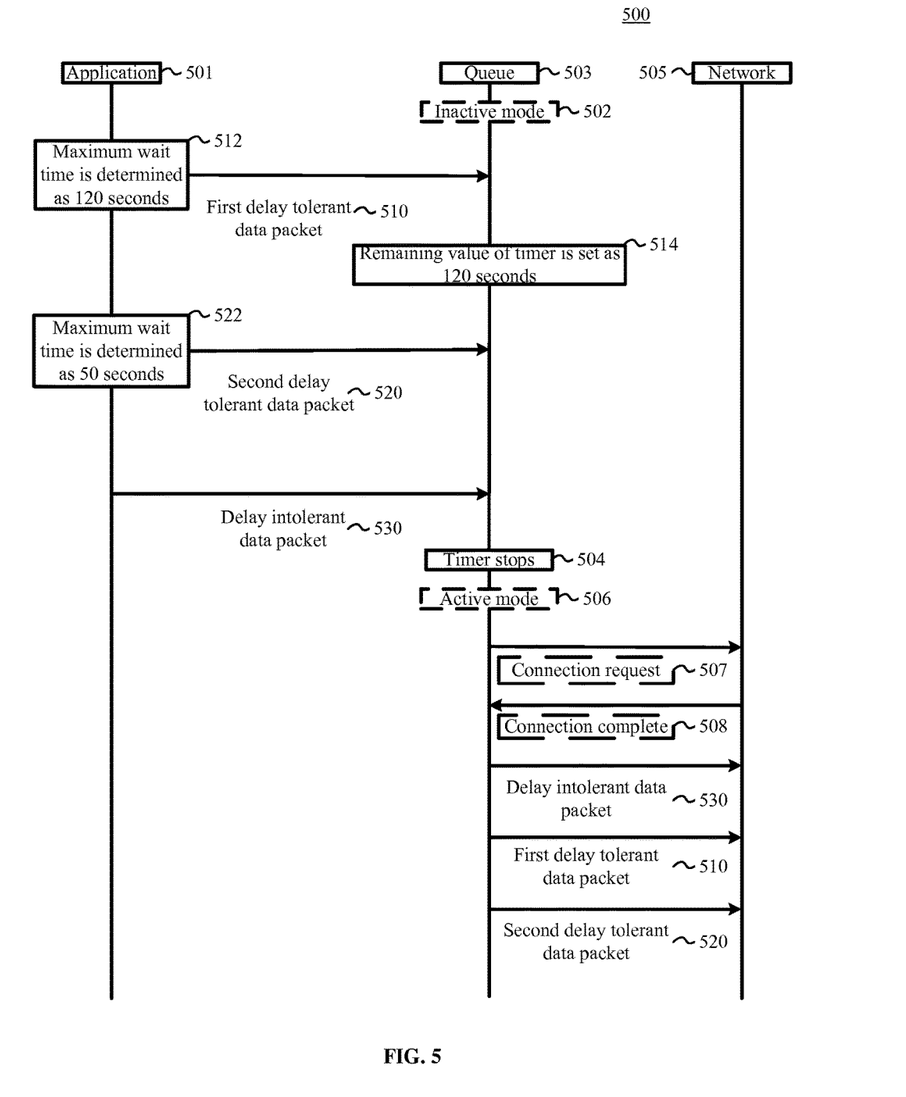
FIG. 5 schematically illustrates a flow diagram presenting an implementation of the method for prolonging a lasting time of an inactive mode according to another embodiment in the present disclosure.

FIG. 5 schematically illustrates a flow diagram presenting an implementation 500 of the method for prolonging a lasting time of an inactive mode according to one embodiment in the present disclosure. Referring to FIG. 5, in the implementation 500, a first delay tolerant data packet 510 is formatted using an application 501, and in a step 512, a maximum wait time of the first delay tolerant data packet 510 is determined as 120 seconds. In an inactive mode 502, the first delay tolerant data packet 510 is pushed into a queue 503. In a step 514, a remaining value of a timer is set as 120 seconds, which is the maximum wait time of the first delay tolerant data packet 510. After a period of time, for example, 80 seconds, a second delay tolerant data packet 520 is formatted using the application 501, and in a step 522, a maximum wait time of the second delay tolerant data packet 520 is determined as 50 seconds. In the inactive mode 202, the second delay tolerant data packet 520 is pushed into the queue 503. Since the maximum wait time of the second delay tolerant data packet 520 is greater than the remaining value of the timer at this moment, which is 40 seconds, the remaining value of the timer is not updated. Next, a delay intolerant data packet 530 is pushed into the queue 503. In this case, the timer ceases 504 immediately, and the inactive mode 502 is switched to an active mode 506. Thereafter, a connection request 507 may be sent to the network 505 from the queue 503, and after an acknowledgement (not shown) form the network 505 is received by the queue 503, a connection complete 508 may be sent to the queue 503 from the network 505 so that a network connection is established successfully. After the network connection is established successfully, the delay intolerant data packet the 530 is sent to the network 505 first, and then, the first delay tolerant data packet 510 an the second delay tolerant data packet 520 are one-by-one sent to the network 505.

Figure 6:
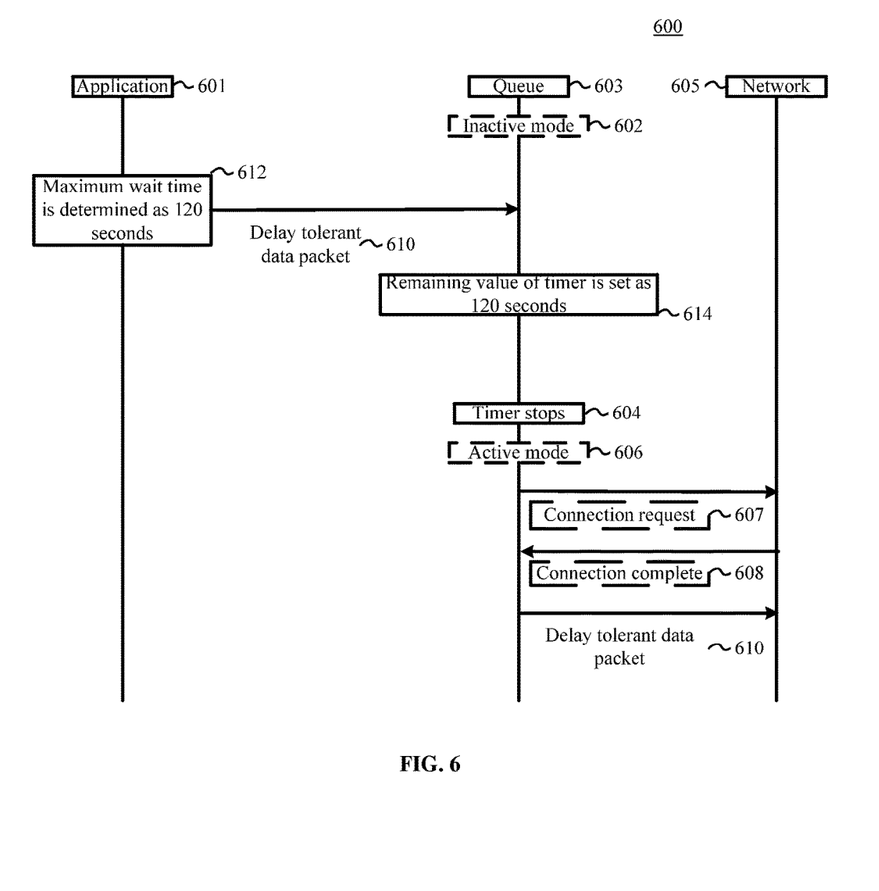
FIG. 6 schematically illustrates a flow diagram presenting an implementation of the method for prolonging a lasting time of an inactive mode according to another embodiment in the present disclosure.

FIG. 6 schematically illustrates a flow diagram presenting an implementation 600 of the method for prolonging a lasting time of an inactive mode according to one embodiment in the present disclosure. Referring to FIG. 6, in the implementation 600, a delay tolerant data packet 610 is formatted using an application 601, and in a step 612, a maximum wait time of the delay tolerant data packet 610 is determined as 120 seconds. In an inactive mode 602, the delay tolerant data packet 610 is pushed into a queue 603. In a step 614, a remaining value of a timer is set as 120 seconds, which is the maximum wait time of the delay tolerant data packet 610. Due to a user action, the timer stops 604 immediately, and the inactive mode 602 is switched to an active mode 606. Next, the delay tolerant data packet the 610 is sent to a network 605.

In some embodiments, referring to FIG. 6, in the implementation 600, the delay tolerant data packet 610 is formatted using the application 601, and in the step 612, the maximum wait time of the delay tolerant data packet 610 is determined as 120 seconds. In the inactive mode 602, the delay tolerant data packet 610 is pushed into the queue 603. In the step 614, the remaining value of the timer is set as 120 seconds, which is the maximum wait time of the delay tolerant data packet 610. Due to a user action, the timer stops 604 immediately, and the inactive mode 602 is switched to an active mode 606. Next, a connection request 607 may be sent to the network 605 from the queue 603, and after an acknowledgement (not shown) form the network 605 is received by the queue 603, a connection complete 608 may be sent to the queue 603 from the network 605 so that a network connection is established successfully. After the network connection is established successfully, the delay tolerant data packet the 610 is sent to a network 605.

Figure 7:
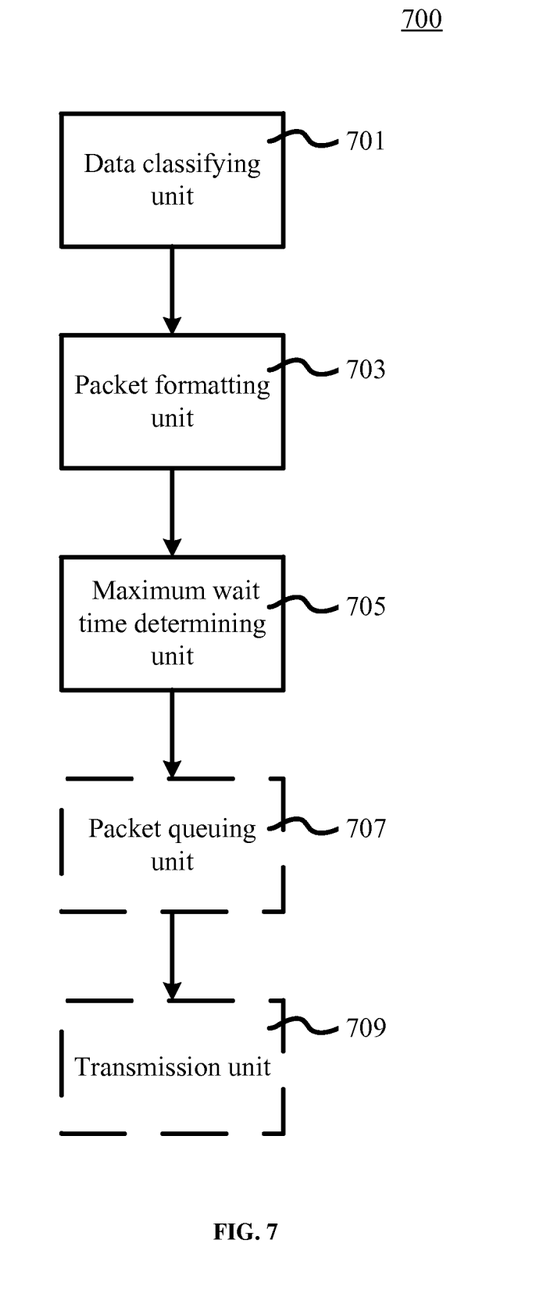
FIG. 7 schematically illustrates a structural diagram presenting an apparatus for prolonging a lasting time of an inactive mode according to one embodiment in the present disclosure.

The present disclosure also provides an apparatus for prolonging a lasting time of an inactive mode. FIG. 7 schematically illustrates a structural diagram presenting an apparatus 700 for prolonging a lasting time of an inactive mode according to one embodiment in the present disclosure.

Referring to FIG. 7, the apparatus 700 includes:
  a data classifying unit 701, adapted for classifying data to be sent as delay tolerant data and delay intolerant data;
  a packet formatting unit 703, adapted for formatting the delay tolerant data into at least one delay tolerant data packet; and
  a maximum wait time determining unit 705, adapted for determining a maximum wait time for each of the at least one delay tolerant data packet, where the maximum wait time is adapted to determine for how long the device may remain in the inactive mode before the delay tolerant data packet shall be sent at latest.

Specifically, in the inactive mode, at least a transmission feature and a reception feature of a device are shut down so that there is no communication with other devices, and at least one processor (e.g. CPU, microprocessor, etc.) is working for processing tasks such as passing data from one layer to other layers, switching the inactive mode to an active mode, etc.

Specifically, classifying data to be sent as delay tolerant data and delay intolerant data is implementation dependent. For example, a measuring device may be designed to take measurement of temperature once per minute, and send these measuring data of temperature once per hour, if no emergency occurs. Equivalently, the measuring device collects 60 sets of measuring data before each communication with other devices. Therefore, in this case, the measuring data of temperature may be classified as the delay tolerant data. However, once the temperature reaches 100 degree Celsius, the measuring device may be adapted to send 10 sets of recent measuring data immediately. Thus, in this case, the 10 sets of measuring data may be classified as the delay intolerant data.

Specifically, formatting the delay tolerant data into at least one delay tolerant data packet may be done using a plenty of methods. Therefore, any one of the plenty of methods may be used to formatting the delay tolerant data into at least one delay tolerant data packet and the delay intolerant data into at least one delay intolerant data packet, and no limitation is imposed on the method used for formatting in the present disclosure.

Specifically, determining a maximum wait time for each of the at least one delay tolerant data packet is implementation dependent. For example, for statistical data or historical data, a relatively long maximum wait time may be determined, as these data are normally not urgent to be transmitted. For another example, real-time data (e.g., data requested by a webpage) may be assigned with a relatively short maximum wait time to ensure their instantaneity.

In some embodiments, referring to FIG. 7, the apparatus 700 may further include: a packet queuing unit 707 adapted for pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer.

In some embodiments, referring to FIG. 7, the apparatus 700 may further include: a packet queuing unit 707 adapted for pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer. Wherein, if the timer is not started, assigning one of the maximum wait times to the timer may include: assigning a smallest one of the maximum wait times of the one or more delay tolerant data packets in the queue to the timer.

In some embodiments, referring to FIG. 7, the apparatus 700 may further include: a packet queuing unit 707 adapted for pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer. Wherein, if the timer is running, assigning one of the maximum wait times to the timer may include: updating the timer, if the at least one delay tolerant data packet with the maximum wait time less than the remaining value of the timer is pushed into the queue.

In some embodiments, referring to FIG. 7, the apparatus 700 may further include: a packet queuing unit 707 adapted for pushing the at least one delay tolerant data packet into a queue, so that the queue may include one or more delay tolerant data packets, each of which has the maximum wait time, wherein, prior to pushing the at least one delay tolerant data packet into the queue, the queue may or may not be empty; and assigning one of the maximum wait times to a timer. Wherein, the timer may be any hardware timer or any software timer, thus the present disclosure does not impose any limitation on the timer. Wherein, if the timer is running, assigning one of the maximum wait times to the timer may include: updating the timer, if the at least one delay tolerant data packet with the maximum wait time less than the remaining value of the timer is pushed into the queue. Wherein, updating the timer, if the at least one delay tolerant data packet with the maximum wait time less than the remaining value of the timer is pushed into the queue may include: comparing the maximum wait time of the at least one delay tolerant data packet with the remaining value of the timer; and, if a smallest maximum wait time of the at least one delay tolerant data packet is less than the remaining value of the timer, a smallest maximum wait time of the one or more delay tolerant data packets in the queue is assigned to the timer.

Specifically, each of the one or more delay tolerant data packets in the queue may be stored in a non-transitory storage medium, such as a Read-Only Memory (ROM), a Random Access Memory (RAM), a flash memory, an Erasable Programmable ROM (EPROM), an Electrically Erasable Programmable ROM (EEPROM), a magnetic card, an optical card, any type of disk including a floppy disk, an optical disk, a Compact Disc-ROM (CD-ROM) and a magnetic-optical disk, etc.

In some embodiments, referring to FIG. 7, the apparatus 700 may further include: a transmission unit 709 adapted for switching the inactive mode to an active mode; and sending at least one of the one or more delay tolerant data packets in the queue.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to sending the delay intolerant data packet, the inactive mode may be switched to the active mode, and a part of the one or more delay tolerant data packets in the queue may be sent. Wherein, the delay intolerant data packet may be sent before sending the part of the one or more delay tolerant data packets in the queue; or the delay intolerant data packet may be pushed into the queue and sent with the part of the one or more delay tolerant data packets in the queue.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to sending the delay intolerant data packet, the inactive mode may be switched to the active mode and the one or more delay tolerant data packets in the queue may be sent till the queue is empty. Wherein, the delay intolerant data packet may be sent before sending the one or more delay tolerant data packets in the queue; or the delay intolerant data packet may be pushed into the queue and sent with the one or more delay tolerant data packets in the queue.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to a user action such as touching a screen, pushing a button, etc., or any other reason, the inactive mode may be switched to the active mode, and a part of the one or more delay tolerant data packets in the queue may be sent.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to a user action such as touching a screen, pushing a button, etc., or any other reason, the inactive mode may be switched to the active mode, and the one or more delay tolerant data packets in the queue may be sent till the queue is empty.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to expiration of the timer, the inactive mode may be switched to the active mode, and a part of the one or more delay tolerant data packets in the queue may be sent. Wherein, the part of the one or more delay tolerant data packets includes a delay tolerant data packet with an expired maximum wait time.

In some embodiments, referring to FIG. 7, the apparatus 700 may further include: a transmission unit 709 adapted for switching the inactive mode to an active mode; and sending at least one of the one or more delay tolerant data packets in the queue. Wherein, due to expiration of the timer, the inactive mode may be switched to the active mode, and the one or more delay tolerant data packets in the queue may be sent till the queue is empty.

Specifically, the apparatus 700 may be applied to both single application and multiple applications, thus the apparatus 700 may include at least one processor (e.g. CPU, microprocessor, etc.), and the apparatus 700 may further include at least one transmitter for sending a packet to at least one device.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for prolonging a lasting time of an inactive mode, comprising:
   determining, at a device, data to be sent as delay tolerant data and delay intolerant data;
   formatting the delay tolerant data into one or more delay tolerant data packets;
   determining a maximum wait time for each of the one or more delay tolerant data packets, wherein the maximum wait time is adapted to determine for how long the device remains in the inactive mode at latest before the delay tolerant data packet is sent;
   pushing the one or more delay tolerant data packets into a queue, so that the queue comprises one or more delay tolerant data packets, wherein the one or more delay tolerant data packets are stored in a non-transitory storage medium, wherein a timer is set with the maximum wait time of the delay tolerant data packet which is pushed into the queue earliest;
   updating the timer, when one of the one or more delay tolerant data packets with the maximum wait time less than a remaining value of the timer is pushed into the queue;
   when the timer expires, a delay intolerant data packet is pushed into the queue, or there is a user action, switching the inactive mode to an active mode; and
   sending at least one of the one or more delay tolerant data packets in the queue.

2. The method according to claim 1, wherein a part of the one or more delay tolerant data packets in the queue are sent.

3. The method according to claim 1, wherein the one or more delay tolerant data packets in the queue are sent till the queue is empty.

4. The method according to claim 1, wherein, if the inactive mode is switched to the active mode when the timer expires, a part of the one or more delay tolerant data packets in the queue is sent, where the part of the one or more delay tolerant data packets comprises a delay tolerant data packet with an expired maximum wait time.

5. The method according to claim 1, wherein updating the timer, when one of the one or more delay tolerant data packets with the maximum wait time less than a remaining value of the timer is pushed into the queue comprises:
   comparing the maximum wait time of one of the one or more delay tolerant data packets with the remaining value of the timer; and
   if the maximum wait time of the one of the one or more delay tolerant data packets is less than the remaining value of the timer, updating the timer with the maximum wait time of the one of the one or more delay tolerant data packets.

6. An apparatus for prolonging a lasting time of an inactive mode, comprising:
   a data classifying unit configured to determine data to be sent as delay tolerant data and delay intolerant data;
   a packet formatting unit configured to format the delay tolerant data into one or more delay tolerant data packets;
   a maximum wait time determining unit configured to determine a maximum wait time for each of the one or more delay tolerant data packets, wherein the maximum wait time is adapted to determine for how long the apparatus remains in the inactive mode at latest before the delay tolerant data packet is sent;
   a packet queuing unit configured to: push the one or more delay tolerant data packets into a queue, so that the queue comprises one or more delay tolerant data packets, wherein the one or more delay tolerant data packets are stored in a non-transitory storage medium, wherein a timer is set with the maximum wait time of the delay tolerant data packet which is pushed into the queue earliest, and
   update the timer, when one of the one or more delay tolerant data packets with the maximum wait time less than a remaining value of the timer is pushed into the queue; and
   a transmission unit configured to: when the timer expires, a delay intolerant data packet is pushed into the queue, or there is a user action, switch the inactive mode to an active mode, and
   send at least one of the one or more delay tolerant data packets in the queue.

7. The apparatus according to claim 6, wherein the transmission unit is configured to send a part of the one or more delay tolerant data packets in the queue.

8. The apparatus according to claim 6, wherein the transmission unit is configured to send the one or more delay tolerant data packets in the queue till the queue is empty.

9. The apparatus according to claim 6, wherein, if the inactive mode is switched to the active mode when the timer expires, the transmission unit is configured to send a part of the one or more delay tolerant data packets in the queue, where the part of the one or more delay tolerant data packets comprises a delay tolerant data packet with an expired maximum wait time.

10. The apparatus according to claim 6, wherein, when one of the one or more delay tolerant data packets with the maximum wait time less than a remaining value of the timer is pushed into the queue, the packet queuing unit is configured to:
    compare the maximum wait time of one of the one or more delay tolerant data packets with the remaining value of the timer; and
    if the maximum wait time of the one of the one or more delay tolerant data packets is less than the remaining value of the timer, update the timer with the maximum wait time of the one of the one or more delay tolerant data packets.

* * * * *